W. H. GOODCHILD & S. F. HAY.
MEAT AND VEGETABLE CUTTERS.

No. 186,829. Patented Jan. 30, 1877.

WITNESSES:
Edward W. Mackintosh.
Thomas W. Capen.

William H Goodchild
Samuel F. Hay
INVENTORS.

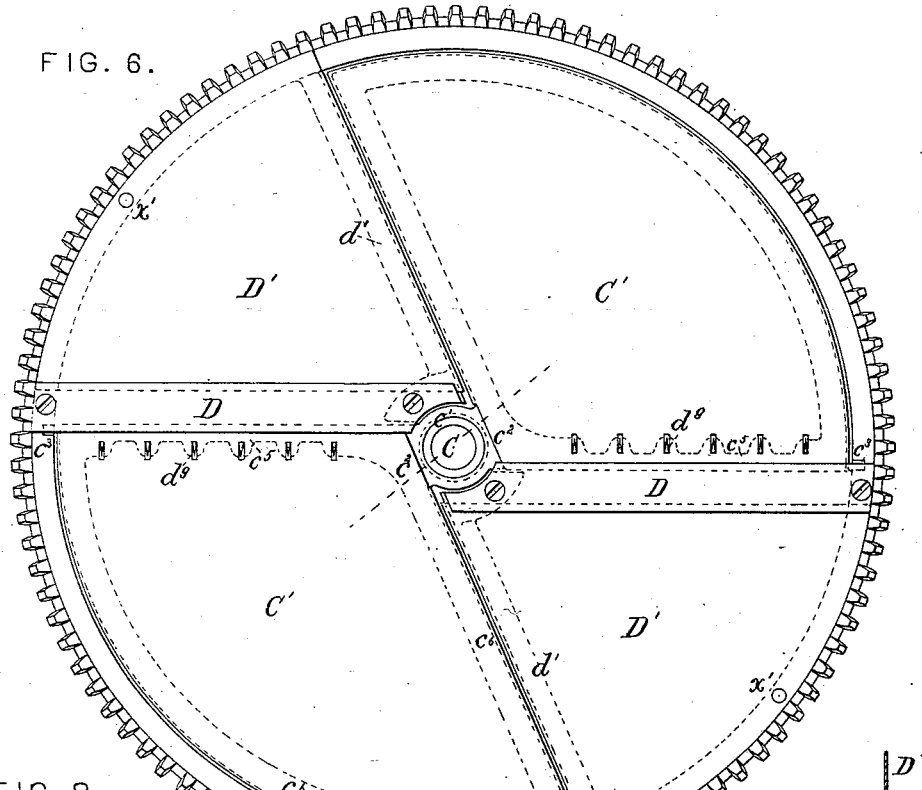

4 Sheets—Sheet 3.

W. H. GOODCHILD & S. F. HAY.
MEAT AND VEGETABLE CUTTERS.

No. 186,829. Patented Jan. 30, 1877.

WITNESSES:
Edward W. Mackintosh.
Thomas W. Capen.

William H Goodchild.
Samuel F. Hay.
INVENTORS.

N. PETERS, PHOTO-LITHOGRAPHER, WASHINGTON, D.C.

4 Sheets—Sheet 4.

W. H. GOODCHILD & S. F. HAY.
MEAT AND VEGETABLE CUTTERS.

No. 186,829. Patented Jan. 30, 1877.

WITNESSES:
Edward H. Mackintosh
David W. Price

William H Goodchild
Samuel F. Hay

INVENTORS.

UNITED STATES PATENT OFFICE.

WILLIAM H. GOODCHILD, OF NEW YORK, N. Y., AND SAMUEL F. HAY, OF METUCHEN, NEW JERSEY; SAID HAY ASSIGNOR TO SAID GOODCHILD.

IMPROVEMENT IN MEAT AND VEGETABLE CUTTERS.

Specification forming part of Letters Patent No. 186,829, dated January 30, 1877; application filed May 11, 1876.

*To all whom it may concern:*

Be it known that we, WILLIAM H. GOODCHILD, of the city, county, and State of New York, and SAMUEL F. HAY, of the town of Metuchen, county of Middlesex, State of New Jersey, have invented certain new and useful Improvements in Machines for Cutting Meat and Vegetables, and for Paring and Slicing Apples; and we do hereby declare that the following is a full, clear, and exact description of the same, reference being had to the accompanying drawings, and the letters and figures of reference marked thereon, which form a part of this specification.

The object of our invention is to provide an improved machine of light but strong construction, arranged so as to combine within itself the capabilities of a vegetable-slicer, a meat-hasher, and an apple parer and slicer, with capacities for simple and almost instantaneous adjustment for either of the above purposes.

Our machine, as arranged for a meat and vegetable cutter, is of that class in which one or more sets of cross cutting or slitting knives are used, in combination with radial slicing-knives, in a rotating cutter head or wheel, for the purpose of reducing the material acted upon thereby into fine pieces.

Figure 1:
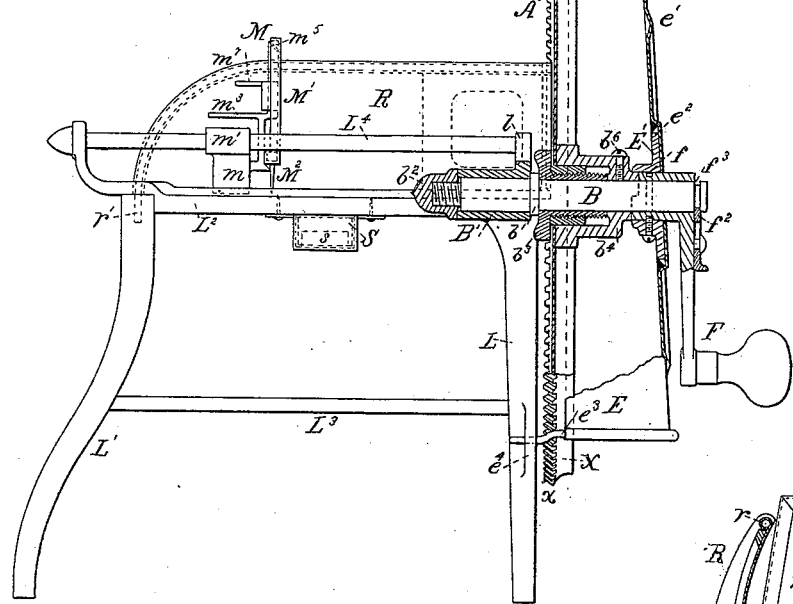
Figure 3:
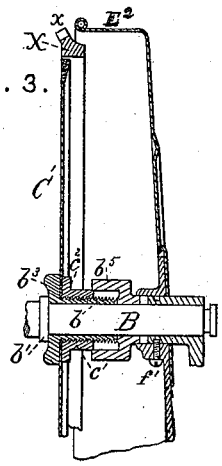
Figure 2:
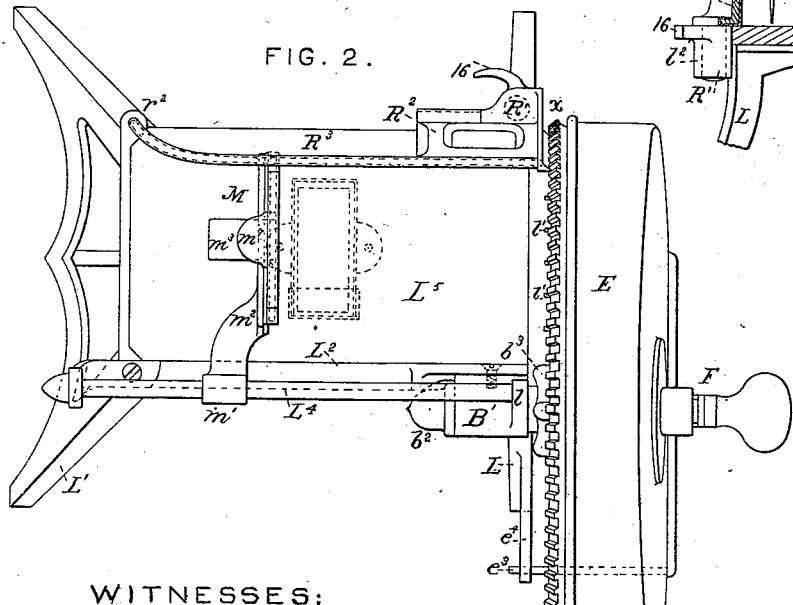
Figure 4:
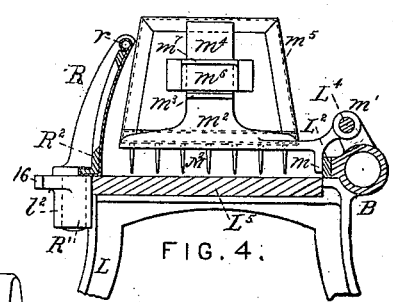
Figure 5:
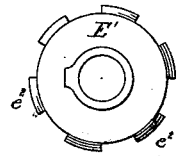
Figure 11:
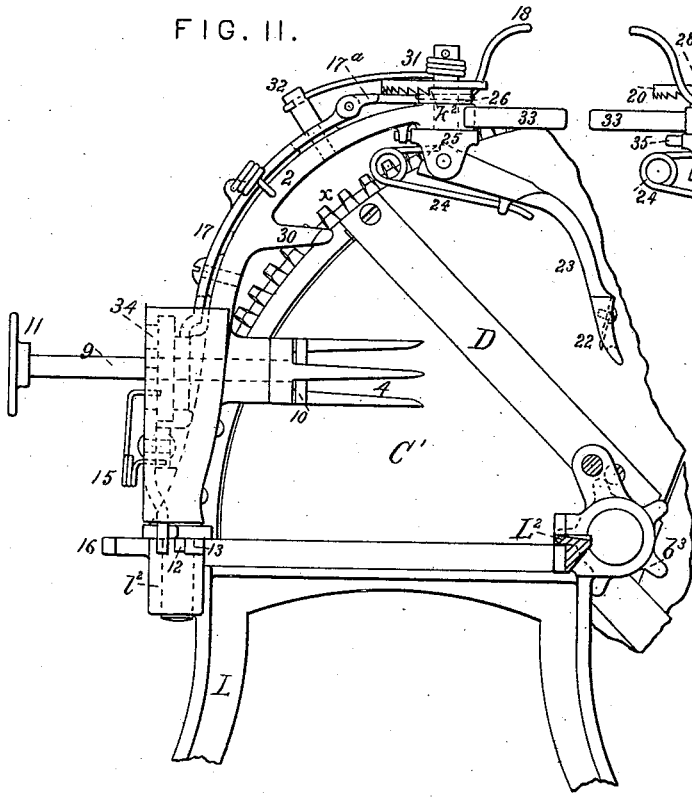
Figure 12:
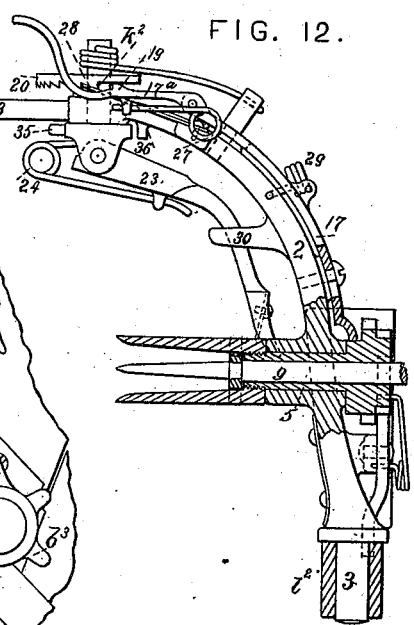
Figure 13:
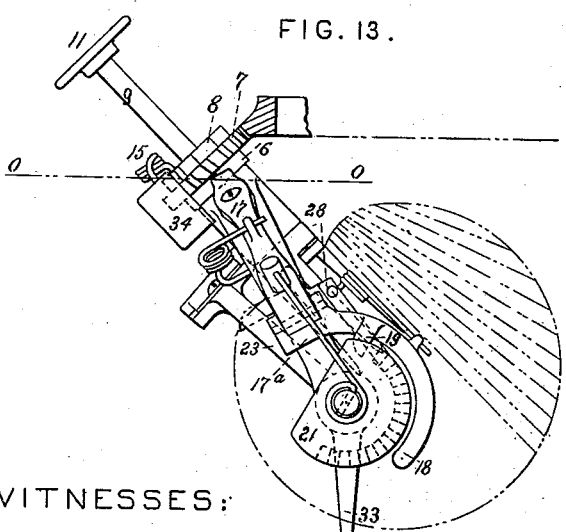
Figure 14:
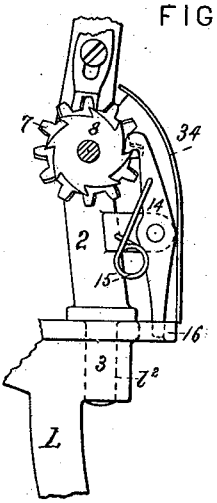
Figure 15:
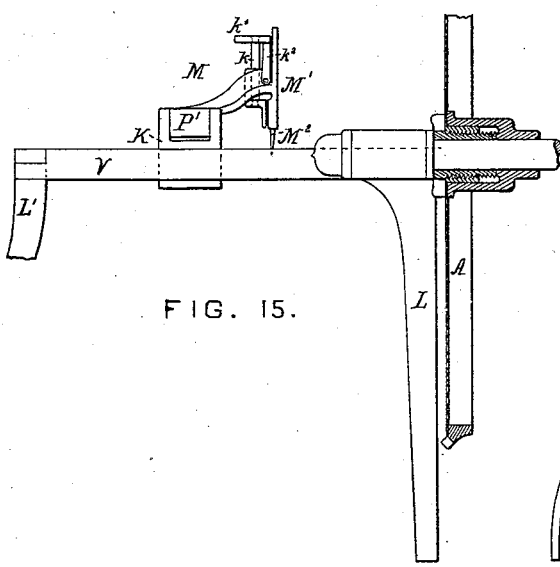
Figure 16:
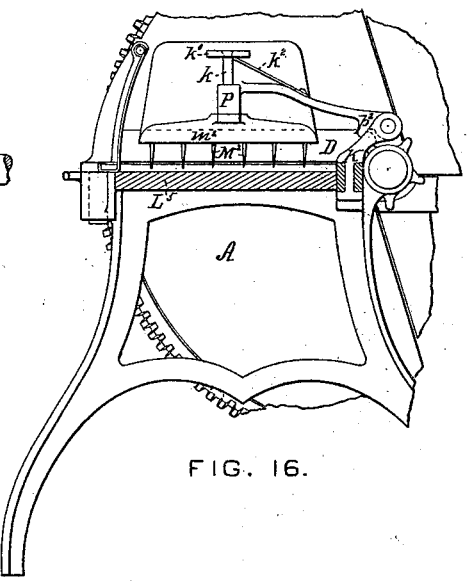
Figure 17:
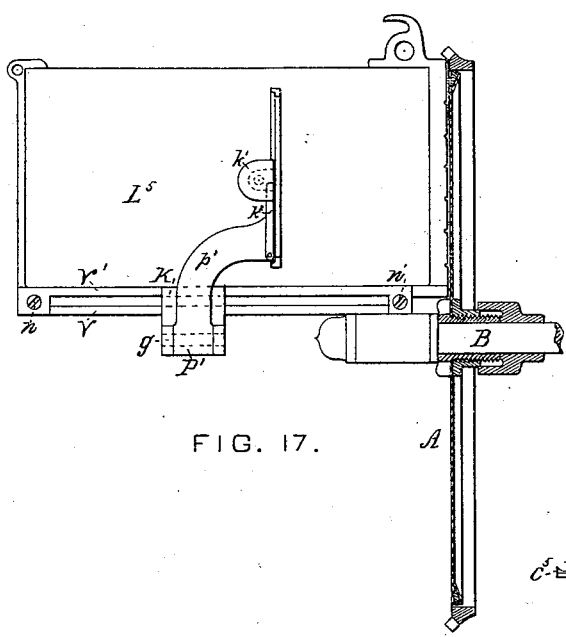
Figure 18:
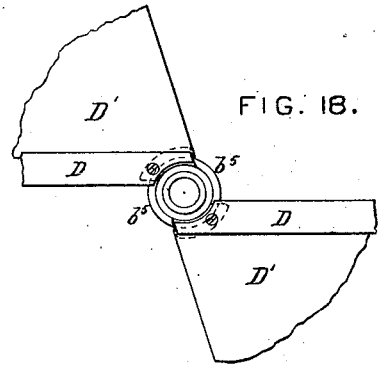
Figure 19:
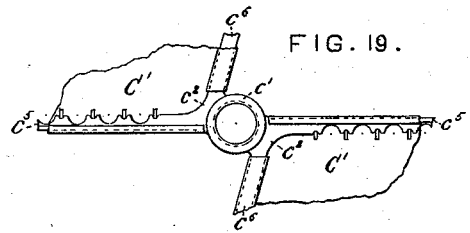

In the annexed drawings, Figure 1 is a sectional elevation of our machine as adjusted for vegetable or meat cutting. Fig. 2 is a plan of Fig. 1. Fig. 3 is a section through the hub of cutter-wheel and adjustable gage-plate. Fig. 4 is a sectional elevation of table, back fender, and feeding apparatus, when the face of the latter is about on a line with the collar $b^1$ on the shaft B. Fig. 5 shows the central support $E^1$ of the case E detached therefrom. Fig. 6 is a front view of cutter-wheel A without adjusting-nut $b$, and removed from the shaft B. Fig. 7 is a back view of a portion of cutter-wheel A, showing the slitting-knives $d$ and connections; also, their adjustable coverings. Fig. 8 shows the mode of locking the knives $d$ in the bearing $x^2$ on the rim X. Fig. 9 is a cross-section of knives $d$, their supports, and adjustable coverings. Fig. 10 is a cross-section on the line $h\ h$, Fig. 7. Fig. 11 is an elevation of our apple-parer. Fig. 12 is a sectional elevation of our parer from the reverse side of Fig. 11. Fig. 13 is a plan of our parer. Fig. 14 is an elevation, showing the drive-pinion and adjacent parts. Fig. 15 shows a modification of our feeding apparatus M in elevation. Fig. 16 is a back view of feeder M. Fig. 17 is a plan of Fig. 15. Fig. 18 is a view of the central portion of the cutter-wheel A, showing the front of the hub $b^4$, the gage-plate C being removed therefrom. Fig. 19 shows the central portion of the gage-plate C, the same being lifted from the hub $b^4$ and turned over, to present a back view thereof.

Similar letters and figures of reference indicate like parts.

Upon the leg L of the frame which supports the table-top $L^5$ is formed a bearing, B', for the shaft B, which latter is held laterally while it rotates by the nut $b^2$ and collar $b^1$, which is rigid upon B. The adjusting-nut $b$ is loosely fitted upon the shaft B. Figs. 1, 3, 6, 18, and 19 show the construction of the central hub $b^4$ and its connection with the rim X and gage-plate C. So much of said hub $b^4$ as projects forward to the face of the wheel A is strongly connected to the rim X by the bars or spokes $d^1$ cast therewith, and the steel radial slicing-knives D, which are firmly screwed to both hub and rim, and form additional spokes to strengthen the entire wheel A. Those portions $b^5$ of the hub $b^4$ which are back of the central portions $c^2$ of the gage-plate C, are recessed from the face of wheel A for a distance equal to the thickest cut it is desired to give the knives D $d$, and the thickness of the gage-plate casting. In the hub $b^4$ is also formed a recess of sufficient depth to hold the adjusting-nut $b$, and of such diameter as will permit a free lateral movement therein of the concentric hub $c^1$ of the gage-plate C. This hub $c^1$ is tapped to snugly but freely move back and forth within the recess in $b^4$ upon a screw-thread cut on the nut $b$, on turning the latter on the shaft B by means of its enlarged portion $b^3$ in front of the wheel A. Any such motion of $b$ causes the entire gage-plate C to recede from or advance to the cutting-edges of knives D, thus affording convenient and simple means for gaging the thickness of their cut to a nicety.

The central bearing of the frame of the gage-plate on the nut $b$, and the supports $c^3$, projecting from the outer edge of said frame into the rim X, prevent undue shaking of the plate C, insure its correct lateral movement, and cause it to revolve with the other portions of cutter-wheel A. The set-screw $b^6$ tightly binds the wheel A to the shaft B. The adjusting nut $b$ is confined laterally between the collar $b^1$ and the base of the recess in the hub $b^4$. The shaft B, wheel A, collar $b^1$, and nut $b$ revolve together. Friction against $b^1$ being thus avoided, any cut of which the machine is capable may be taken off by the knives D $d$ without disturbing the set-adjustment of the gage-plate C.

In embodying our arrangement of gage-plate C and knives D in wheel A in a machine for tobacco, root, smoked meat, or other heavy cutting, it would be desirable to have the four sectional faces of the wheel formed entirely of moderately heavy cast or wrought iron, except the cutters D; but our special object being to provide a machine for use in the kitchen, having in a given size and in all its parts a maximum of strength, with a minimum of weight and the greatest rigidity, we construct said faces as follows: The relation of the bars $d^1$ and knives D to the hub $b^4$ and rim X is above stated. The spaces between said bars and knives we cover by tin or sheet-metal plates D'. These plates $D^1$, knives D, and the face of rim X revolve close to the edge of the table $L^5$, irrespective of the position of the gage-plate C. Into the top edges of the knives D we cut a slot, into which we insert the edges of the face-plates D', thus tonguing and grooving them together, as shown. The segmental sides or edges of D' are extended around and upon the face of rim X, to which they are secured by rivets $x^1$, which are outside of the face-line of back fender R, and cannot catch upon the substance fed up to the knives.

We avoid the above-mentioned obstruction of nail or rivet heads in the face of D' within the line of the cut of the knives D, and also avoid any sharp edges on D' which would cut any person while cleaning the machine, by bending said plates D' entirely around the bars $d^1$, and soldering them upon themselves at the back, as shown in Fig. 10. The bars $d^1$ are of the same thickness as the rim X, to prevent any opening through the face of wheel A when the gage-plate C is set back its farthest distance from the edge of knives D other than that near the said cutting-edges through which the cut material passes.

By joining the plates $D^1$ to the spokes $d^1$ and rim X, as set forth, we secure lightness and rigidity of parts, and add strength to the wheel A. We tongue and groove together the plates $D^1$ and the strong steel radial knives D, as before set forth, for the important purpose of stiffening the said plates, that they may resist any tendency to bulge out and separate from the knives D. D' and D being thus always held firmly together, any escape of the cut material through the face of wheel A through openings between D' and D is prevented, and the equivalents to thin large cutting-blades thus formed insure a clean, easy cut, and a free backward discharge of the cut material from the wheel A. The cutting-knives D can also be easily removed, for sharpening or to be replaced by new cutters, independently of any other portion of wheel A, which is not possible in cutting-machines in which the cutting-edges are formed by raising or striking up portions of a sheet-metal disk or face, as any sharpening of the said raised cutting-edges would wear holes in the said disk, and the said cutting-edges could be replaced to the best advantage only by purchasing a new machine.

The sectional faces C' of the gage-plate C we also form of sheet-metal, fixed to cast frames. The two portions $c^6$ of said frames, next the bars $d^1$ and around the outer segments, are shown in section in Figs. 3 and 10. The facings C' are bent and soldered around said parts $c^6$, to avoid the presence of rivet-heads and sharp edges, in substantially the same manner as D' are fixed to bars $d^1$. We bend the facings C' over, and for some distance around, the bars $c^5$, which form portions of the frame of the gage-plate sections, and will be hereafter more particularly described.

All substances cut by our machine are fed against the face of wheel A, and being acted upon by the knives D, or by both D and $d$, they pass through the wheel, and are discharged at the back thereof.

Cases have heretofore been employed to inclose the cutter-wheel of vertically-revolving rotary cutters, to prevent the scattering or discharge of the material cut by them in any other than a downward direction; but the said cases have been constructed in parts or sections, one or more of such parts being made removable, as in the patent of Z. T. Hartman, No. 155,797, October 13, 1874, which construction prevents the easy and thorough cleansing of the inside of the rigidly-attached portions of the case and the cutter-wheel within the same. Another instance is shown in the patent of N. Schlesser, No. 140,221, June 24, 1873, in which the case is combined with the cutter-wheel, so as to permit the removal of said cutter-wheel from the case to allow a cleansing of both wheel and case, on throwing over the hinged upper portion of the same.

In both the above instances the covering or case completely boxes the back, sides, and front of the upper half of the cutter-wheel, and the material to be cut is fed through a hopper, and opening in the case, to the wheel.

In contradistinction to the above, we represent the special features of novelty in our case E, herein shown, to be constructing the said case E with a flange, $E^2$, which projects backward from the face or body of the case sufficiently far to overlap the rim of the cutter-wheel A, and thus prevent a scattering or discharge of the cut material in any other than a downward direction. This leaves the entire face of cutter-wheel A free from any covering connected with the case, renders the use of hoppers before mentioned unnecessary, permits the whole of said case to be drawn laterally from its bearings or supports, and entirely free from the wheel A, to permit the easy and thorough cleansing of every part of both case and wheel, without removing the latter from its bearings on the driving-shaft. We form the face and flange $E^2$ of our case E, preferably, of one piece, wire the edge at $e$, and corrugate its face, as at $e^1$. Its central portion is raised up from the back, forming a recess on the inside. Into this recess we insert a cast-metal bearing and steadying support, $E^1$, the center of which is loosely bored to fit over the handle F. To fasten $E^1$ within E more firmly, cheaply, and neatly than can be done by rivets, we cast the edge of the former, leaving tooth-like projections $e^2$, the face edges of which we bevel, as shown in Figs. 1, 3, and 5. Placing $E^1$ within the recess in E, the angular spaces between and around $e^2$ are filled with molten solder, which adheres to the tin case E, and prevents $E^1$ from falling out or turning. This case E, with flange $E^2$, may be extended downward and closed at the bottom, thus forming of itself a receptacle for the cut material; but we prefer to cut off a segment of its bottom, and allow the cuttings to fall into a pan or dish placed below the opening. We wire this opening, as at $e^3$, one of the sides of which wire we extend into a bearing formed in a projection from the leg L, as at $e^4$. Both sides of $e^3$ may extend into bearings formed in leg L; but we consider one bearing a sufficient support in combination with the shaft B. To secure the handle F to case E, so as to remove them from the shaft together, and thus avoid unnecessary handling of parts, we turn a groove, $f$, in the handle F. The screw $f^1$ in $E^1$ projects into $f$, leaving F free to turn. Said handle F connects with the hub $b^4$ over the round shaft by the well-known halved joint, and is retained in place by the slide $f^2$, the semicircular top of which projects into the groove $f^3$ turned in the shaft B.

That portion of the shaft upon which the handle F is placed may be formed square, and the handle fitted to it, thus dispensing with the halved joint and slide $f^2$, without disturbing the arrangement of the case E, its central support $E^1$, or the connection of the same with the handle F. It will be evident that the central support $E^1$ will keep case E entirely free of the wheel A, or any of the parts connected therewith and jointly with the wire $e^3$, acting in a support independent of the shaft or wheel, will provide a sufficient support for the said case, and prevent its turning or giving motion to wheel A through handle F.

Our arrangement of crosscutting or slitting knives is shown in detail in Figs. 6, 7, 8, and 9. Cast upon the rim X and hub $b^4$, back sufficiently from the face of wheel A to allow the full backward movement of the adjustable gage-plate C, are the projecting bearings $x^2$ and $b^7$, which are correspondingly grooved to permit the bars $d^2$, upon which the knives $d$ are placed, to snugly slide therein. Pieces $d^3$, on the bars $d^2$, separate the knives $d$ the required distance.

Projecting upward from the body of the cross-bars $d^4$, at each end, are the yokes $d^5$, which straddle the knife-bars $d^2$. The opposite downward projections $d^6$ are pivoted on the projections $x^2$ $b^7$. The levers $d^7$ are loosely riveted upon the back of cross-bars $d^4$, and project outward through $x^2$ beyond the rim X. The springs $d^8$ act downward to keep $d^7$ engaged in either of the slots $x^3$ $x^4$, cut in the projections $x^2$. The cross-bars $c^5$, while acting as portions of the framing of the gage-plate C, also prevent any side play of the knives $d$, which pass through slots $d^9$, cut in $c^5$, which latter also supplies a firm bearing for the backs of said knives $d$, which almost entirely relieves the bars $d^2$, slides, and lower pivots of strain when the said knives $d$ are in use.

When the levers $d^7$ are in the slots $x^4$ the points of all the knives $d$ will be drawn so far back that they will not cut, though the gage-plate C be adjusted to give the greatest possible cut to knives D.

To change the machine from a plain slicer to a hasher or mincer, the levers $d^7$ are raised from slots $x^4$, and swung over into slots $x^3$, which simple movement slides the points of all the knives $d$ through the slots $d^9$ and plates C', out a little beyond the cutting-edges of the radial slicing-knives D and the face of wheel A, the revolution of which causes said points of $d$ to pass through slots $l^1$, cut in the table L, which insures the complete cutting of any substance fed to the knives into small pieces, the length of the spaces between the knives $d$, and of any desired thickness, by adjusting the gage-plate C, a single adjustment and locking of the knives $d$ into $x^3$, as aforesaid, sufficing for any thickness of the cut of wheel A.

The knives $d$ are always attached to the back of the wheel A. To insure their cleanliness, we fix the outer sheet-metal boxes T to the projections $b^7$ and rims X by screws $t$. The hub $b^4$ forms the inner ends of the boxes T, and their outer ends have holes cut therein sufficiently large to permit the free operation of the levers $b^7$, which extend through T, as shown.

To the back of plates C' are secured the sheet-metal strips T', which project backward about as far as the cross-bars $c^5$. The sides of boxes T sufficiently overlapping both $c^5$ and T', it is evident that any lateral movement of C will cause $c^5$ and T' to slide within the boxes T. The double box thus formed always closely covers the knives and their operating mechanism, and also the recess at $b^5$ in the hub $b^4$.

If so desired, the slitting-knives $d$ can be placed within the wheel A on a different radius from the knives D, to prevent their cutting at about the same time. In such case the outer bearings $x^2$ would project from the rim X at such point as would separate D from $d$ the required distance, and the frame-bars around which the facing C' would be bent would be of the same cross-section as at $c^6$, Fig. 10, and be placed in the position the bars $c^5$ now occupy, and the said bars $c^5$, with lugs $c^3$ thereon, would be cast with the framing $c^6$ of the gage-plate, and hold the same relation to the slitting-knives $d$, their bearings $x^2$ $b^7$, and the rim X, as above set forth, and the upper sides or tops of the boxes for inclosing the knives $d$, now formed by the bars $c^5$, would be separately formed of sheet metal, and be fastened upon the back of the movable gage-plate, as is the lower side T' in the drawings.

Our improved feeding apparatus M is shown in Figs. 1, 2, 4, 15, 16, and 17.

The especial object of this part of our invention is to provide a feeder for meat, vegetable, or other cutting machines, so arranged that any sticky substances which cannot be readily pushed or slid over the flat surface of the table of the machine may be forcibly seized and carried up to the cutters of the same; also, to provide mechanical means for stripping said substances from the teeth of the feeder, and also provide means for holding and feeding to the cutters any irregularly-shaped substances.

We proceed to describe the feeder as shown in Figs. 1, 2, and 4.

The rod $L^2$, which is screwed to the legs L $L^1$, acts, with the tie-rod $L^3$, to bind the entire table together. $L^2$ also acts as a stop for the heel $m$ of the feeder M, which is placed upon the rod $L^4$, so as to permit it to slide thereon to or from the face of wheel A, and also to swing around below the front of the table, out of the way of the apple-parer, when the latter is adjusted to the machine. Cast with the bearing $m^1$ and heel $m$ is the supporting-extension and stripper-bar $m^2$, with which are cast the handle $m^3$ and bearing $m^4$. To secure lightness and avoid rivet-heads and sharp edges, we solder the sheet-metal face $M^1$ around a cast-metal frame, $m^5$, into the bottom edge of which, and through the facing $M^1$, we insert the teeth or pins $M^2$. The joint action of $L^2$, $L^4$, and heel $m$ keeps the points of the teeth $M^2$ from touching the table-top $L^5$. Soldered fast to the back of $M^1$, so as to slide freely over the bearing $m^4$, is the casting $m^6$, from which extends the handle $m^7$. The bearing $l$ prevents the feeder from contact with the knives in the wheel A.

Any substances which will readily slide over a flat surface may be pushed up to the knives D by the face $M^1$ by sliding the feeder upon the rod $L^4$, and without sticking the teeth $M^2$ therein. To feed to the knives D $d$ meat or other sticky substances, our feeder is held with the left hand by the handle $m^3$, and the upper handle $m^7$ is raised by an upward movement of the thumb, which will raise the points of the teeth $M^2$ above the bottom edge of $m^2$. The feeder can then be swung on $L^4$, and slid over the slices of meat or other substance placed on the table $L^5$, and the teeth $M^2$ forced down through or into them by the handle $m^7$, when they can be forcibly carried up to the knives D $d$. When the feeder is stopped by $l$ the handle $m^7$ is again raised, and the bottom edge of stripper-bar $m^2$ will strip the meat from the teeth $M^2$, leaving it directly in front of the knives, when the whole feeder can be slid back on $L^4$, and the operation repeated without danger of being cut by the knives in wheel A. Swinging the feeder on $L^4$ permits the catching and holding by the teeth $M^2$ of irregularly-shaped substances, to prevent their rolling while being fed to the knives.

We now proceed to describe the feeder as represented in Figs. 15, 16, and 17.

The face of the feeder $M^1$, the bearing P, and the curved projection $p^1$, which connects the face $M^1$ with the bearing P' and slide-piece K, are preferably cast in one piece, as shown. The projection $p^1$ also serves as a handle, to slide the feeder to or from the wheel A. The teeth $M^2$ are inserted in the bottom edge of the face $M^1$. The stripper-bar $m^2$ is firmly fastened to the rod $k$, which is loosely fitted to slide within the bearing P, and has a cap, $k^1$, fastened on its upper end. The spring $k^2$ acts upward to keep the bar $m^2$ in the position shown in the drawings.

The pieces V V', which support the slide-piece K, are fastened together and to the leg $L^1$ by the screw $n$. Their opposite ends are connected and fastened to the leg L by the screw $n'$. The projections $p^2$ on the bearing P' acts against the slide-piece K to keep the points of the teeth $M^2$ from the table top $L^5$. The slide-piece K acts against that end of the slot between V V' nearest the cutters D, to prevent the face $M^1$ striking the said cutters. Swinging the feeder at $g$ permits the feeding of irregularly-shaped substances, as before set forth.

An important feature of our feeder, distinct from the application and operation of the stripper-bar $m^2$, is the mode of inserting the teeth $M^2$ in the lower edge of the face $M^1$, in about the same vertical plane, and quite within the line of the said face, which construction permits the said face to feed material much closer to the cutter-wheel, and leave the last piece or slice much thinner than would be possible if the said face could not be moved quite close to the cutters by reason of the teeth $M^2$ projecting at right or other angle beyond the face $M^1$.

The general purpose and effect of both the feeders above described is the same, the stripping of the teeth $M^2$ of the feeder in Figs. 15, 16, and 17 being performed by lowering the stripper-bar $m^2$ by depressing the cap $k^1$, to which it is attached.

The back face of the table or fender R is shown in Figs. 1, 2, and 4. The special object sought in the construction of this fender is to distribute the metal of which it is formed so as to give the greatest strength with the least weight, and to make it readily removable from the table for cleaning purposes, and to make room for the apple-parer, as hereinafter described. Its face $R^3$ is preferably curved to conform to the cutting-line of knives D. The bearing $l^2$ bored in a stout lug projecting from the leg L provides a support for the stout pin $R^1$, cast upward from which is the frame or backing $R^2$, which re-enforces the tin or sheet-metal face $R^3$, that it may resist any outward push of the material being cut by the knives D $d$. Said face $R^3$ is turned at its top and outer end around the stout wire $r$, one end of which is fastened in the top of $R^2$, the other end forming the pin $r^1$, which loosely fits a bearing, $r^2$, formed in the leg $L^1$. The tin box S with cover, which is attached to the under side of table top $L^5$, serves to hold a whetstone, $s$, to be used in sharpening the knives D $d$.

Figs. 11, 12, 13, and 14 represent our apple parer and slicer.

From the bottom of the curved standard 2 projects the stout pin 3, which snugly fits the bearing $l^2$ in the leg L, the fender R being removed to make room therefor, the entire frame or table of the meat and vegetable cutter thus forming a firm support for the apple parer and slicer. The fork 4 is firmly screwed upon the forward end of rod 5, which is journaled in the standard 2. Upon the back end of 5 is cast the cam 6, skew bevel-gear or pinion 7, and hold-fast 8. Upon the forward end of rod 9, which passes through 5, 6, 7, and 8, is rigidly fastened the head-piece 10, which is of equal outside diameter with the base of fork 4, and is notched around the tines thereof. The handle 11 is rigid on the outer end of rod 9. This arrangement of notched head-piece 10, rod 9, and handle 11 forms a pusher, with which the pared apple or the core thereof is forced off the fork 4, a means of turning the pared apple, so as to present different sections thereof to the action of the slicing-knives D in the wheel A, and also a means of holding said sections up to the knives until they are entirely reduced to slices.

Notching the head-piece 10 around the tines of fork 4 enlarges its face, which prevents its being driven into the apple when pushing it off the fork. The stop 12, cast upon the standard 2, acts against the stop 13, cast upon the leg L, to prevent the swinging of fork 4 against the knives D. The pawl 14 is pivoted to the standard 2, and the spring 15 acts to keep its upper end engaged with hold-fast 8. It is necessary to disengage the pawl 14 from hold-fast 8 when the standard 2 is swung around to gear pinion 7 into the drive-gear $x$, formed upon the rim X of the cutter-wheel A, and the operation of paring the apple is being performed. This we accomplish automatically, by causing the lower end of pawl 14 to strike the stop 16, cast upon the leg L. Swinging the pared apple on the fork 4 toward the slicing-knives D will disengage pinion 7 from drive-gear $x$, and permit the spring 15 to engage pawl 14 with hold-fast 8, the action of which latter, in connection with the notched head-piece 10 and fork 4, will securely hold the apple against the cut of the knives D without any strain on the hand of the person using the machine.

The swinging of the standard 2 on the pin 3 in the bearing $l^2$, will cause the apple to be sliced by the knives D, as indicated in dotted lines in Fig. 13. Any desired thickness of slice can be cut from the apple on adjusting the gage-plate C by the nut $b$, as hereinbefore set forth.

To automatically pare the apple, the cam 6 actuates the sliding bar 17, the upper portion of which, $17^a$, which is hinged to 17, is curved upward at its outer end, to form a pressing knob or handle, 18. The pawl 19, cast upon $17^a$, acts in the ratchet-teeth 20, cast upon the driver 21. The knife 22, in the knife-bar 23, is held up to the apple by spring 24, which is secured to head-piece 25, to which latter the knife-bar 23 is firmly pivoted. The head-piece 25 extends upward through the standard 2 and toothed driver 21, to which latter it is rigidly fastened by a pin, 26. The pawl 19, upon $17^a$, is held up to the teeth 20 by spring 27. The flexible hold-fast 28 is secured to standard 2, and acts in the teeth 20 to hold the driver 21 and knife 22 while the pawl 19 is thrown back to engage with another one of the teeth 20. The spring 29 causes the foot of bar 17 to closely follow the surface of cam 6. The projecting spur 30, cast upon the standard 2, receives and retains the knife-bar 23 after the knife-bar 22 has pared the apple, the knife being brought, meanwhile, quite close to the fork 4, as in Figs. 12 and 13. To bring the said parts 22 and 23 in the position last mentioned has caused the pawl 19 to act upon the last tooth $k$ formed upon the driver 21, and, consequently, any further forward movement of 22 and 23 is prevented, notwithstanding any motion of the pinion 7, whether such motion be caused by revolving 7 by gear $x$, or by turning the apple the reverse way in slicing it, as hereinbefore set forth.

The spring 31 is properly coiled around and fastened to the top of head-piece 25, and secured independently thereof to the stud 32, and acts to swing the knife 22, as hereinafter set forth. The handle 33 is cast from the head of the standard 2, to hold pinion 7 in gear with $x$. The overhanging shield 34 protects the lower working parts from the parings thrown from the knife 22.

In operating our parer upon the first apple, the knife-bar 23 is placed by the hand in the spur 30. The apple is forced hard upon the fork 4, and the handle 18 depressed, which latter movement removes the pawl 19 and hold-fast 28 from the teeth 20 on the driver 21. The spring 30 immediately causes the knife 22 to swing around to the front of the apple, as in Fig. 11, when it is stopped by the stop 35, cast on the head-piece 25, striking the stop 36, cast on the standard 2, which prevents the knife arm or head from striking the wheel A. A slight backward pressure on the upper handle 33 will gear pinion 7 with gear $x$. Upon revolving wheel A the action of cam 6 through the slide-bar 17 17$^a$, driver 21, hold-fast 28, and head-piece 25, will move the knife 22 around a given distance for every revolution of the fork 4, thus paring the apple, and leaving bar 23 in position on the spur 30 for the next one. The whole pared apple may then be removed from the fork 4 by striking the handle 11 of the pusher, or it may be sliced by the knives D, as hereinbefore set forth, leaving the core on the fork, which can be likewise removed by the pusher.

In the drawings, the standard 2 is centered to swing pinion 7 in gear with $x$ on an angle of forty-five degrees with the face of wheel A. By centering the pin 3 on the same line $o\ o$, from the face of wheel A, but farther back from the main bearing B', any angle of inclination with A may be obtained without changing the operation or effect of the machine.

We prefer to center the pin 3 so as to gear pinion 7 with $x$ when the fork 4 is at right angles with the face of A, and rotates in the same plane of motion, as in such case the gear $x$ would not project beyond the face of rim X, and the teeth of pinion 7 be of ordinary form.

To arrange our apple parer and slicer for paring only, it is but necessary to make the stud 3 and bearing $l^2$ of square or such other form as will prevent the swinging of the standard 2, and consequently keep the pinion 7 always in gear with $x$ when the parer is in use. In such arrangement the hold-fast 8, pawl 14, spring 15, and stops 12, 13, and 16 are dispensed with, and the stud or pin R$^1$ of the fender R formed the same as stud 3.

In our machine, as arranged, without removable fender R or slitting knives $d$, and for use in paring and slicing apples only, the swinging standard 2 may be held permanently within the bearing $l^2$ by a pin or nut placed through or upon the stud 3, below the bearing $l^2$. To construct the machine as a plain slicer only, the knives $d$, with their operating means $d^2\ d^3\ d^4\ d^5\ d^6\ d^7\ d^8$, their projecting supports $x^2$ $f^7$, the double covering T T', and the drive-gear $x$ are all omitted, and the cross-bars $c^5$, while retaining the lugs $c^3$, are reduced to the cross-section, as at $c^6$, Fig. 10, and the facings C', without slots cut therein, be secured around the same as therein shown. The forming of the gear $x$ on the rim of a rotary cutter-wheel to impart motion to the operating parts of an apple-paring machine, substantially as herein described, is entirely independent of any particular number or arrangement of knives within the said wheel.

We are aware that an arrangement of a slotted gage-plate, which is laterally adjustable to and from the cutting-edge of a knife, to gage the thickness of the cut of said knife, and which revolves with the knife, is claimed, in principle, in a United States Patent issued January 3, 1865, to George B. Pullinger, of Germantown, Pennsylvania, in which patent is also shown and claimed a combination of slitting-knives with the gage-plate, which requires a separate adjustment of said slitting-knives within the gage-plate, or each different adjustment of the latter.

Having thus fully described our invention, what we claim as new, and desire to secure by Letters Patent, is—

1. The recessed hub $b^4$ of the cutter-wheel A, in combination with the shaft B, adjustable gage-plate C, adjusting-nut $b$, and rim X, all constructed and arranged to operate relatively with each other, substantially as and for the purposes herein set forth.

2. The gage-plate C, constructed of the hub $c^1$, radial and circumferential arms and supports $c^5$, $c^6$, and $c^3$, and facings C', all substantially as and for the purposes specified.

3. The laterally-removable portions of the face of the cutter-wheel A, constructed of the sheet-metal faces D', and radial knives D, arranged to operate relatively with each other, the same being supported by the rim X, bars $d^1$, and hub $b^4$, all substantially as and for the purposes herein specified.

4. In combination with a vertically-revolving cutter-wheel of a rotary cutter, the case E, with central support E$^1$, and flange E$^2$, supported by the shaft B, and independently thereof in the bearing $e^4$, all substantially as and for the purposes herein set forth.

5. The combination of the central support E$^1$, screw $f^1$, and grooved handle F, to connect the latter with the case E, substantially as and for the purpose specified.

6. The combination of the slitting-knives $d$ with the radial slicing-knives D, and adjustable gage-plate C, the said knives $d$ being secured to cutter-wheel A in bearings $x^2\ b^7$, independently of the said gage-plate, substantially as and for the purposes herein set forth.

7. The combination of the slitting-knives $d$, with their supporting-bars $d^2$ and $c^5$, cross-bars $d^4\ d^5\ d^6$, levers $d^7$, and locking-slots $x^3\ x^4$, all substantially as and for the purposes specified.

8. The double coverings T T' $c^5$, in combination with the slitting-knives $d$ and cutter-wheel A, all substantially as and for the purpose set forth.

9. The feeder M, with face M$^1$, teeth M$^2$, and stripper-bar $m^2$, constructed and arranged to operate relatively with each other and with the table L$^5$, and cutter-wheel A, all substantially as and for the purposes herein specified.

10. The fender R, with sheet-metal face R$^3$, backing R$^2$, and pins R$^1$, and $r^1$, constructed and arranged to operate relatively with the table L⁵ and cutter-wheel A, substantially as and for the purposes set forth.

11. The combination of the standard 2, carrying the operating parts of an apple-paring machine, with a rotary cutter, so that the operating parts of the said parer may be driven by a drive-gear, $x$, formed upon the cutter-wheel of said cutter, and to admit of slicing the apple by the said cutter-wheel, all substantially as herein specified.

12. The pusher for discharging the apple from the fork 4, consisting of the handle 11, rod 9, and head-piece 10, in combination with the said fork, substantially as herein set forth.

13. In combination, the hold-fast 8, pawl 14, head-piece 10, rod 9, handle 11, and fork 4, substantially as and for the purposes herein specified.

14. The combination of hold-fast 8, pawl 14, spring 15, stop 16, and fork 4, substantially as and for the purposes herein set forth.

15. The combination of the gear $x$, pinion 7, slide-bar 17 17ª, pawl 19, hold-fast 28, and toothed driver 21, to simultaneously actuate the fork 4, and knife 22, all substantially as herein specified.

WILLIAM H. GOODCHILD.
SAMUEL F. HAY.

Witnesses:
EDWARD D. MACKINTOSH,
DAVID W. PRICE.